E. H. GIBBS.

Improvement in Apparatus for Manufacturing Soap.

No. 123,473. Patented Feb. 6, 1872.

Witnesses:
Geo. H. Snyder
James M. Griggs

Inventor:
Edwin H. Gibbs

UNITED STATES PATENT OFFICE.

EDWIN H. GIBBS, OF NEW YORK, N. Y.

IMPROVEMENT IN APPARATUS FOR MANUFACTURING SOAP.

Specification forming part of Letters Patent No. 123,473, dated February 6, 1872.

Specification of certain Improvements in Apparatus for Manufacturing Soap, invented by EDWIN H. GIBBS, of the city, county, and State of New York, doctor of medicine.

My invention relates to that class of soap-making apparatus in which the fatty and alkaline matters are placed in a digester or close vessel and formed into soap by the combined agency of heat and agitation. My invention consists in an improved construction and arrangement of agitators, in combination with a close digesting-chamber to which heat is applied, all as hereinafter set forth.

Figure 1:
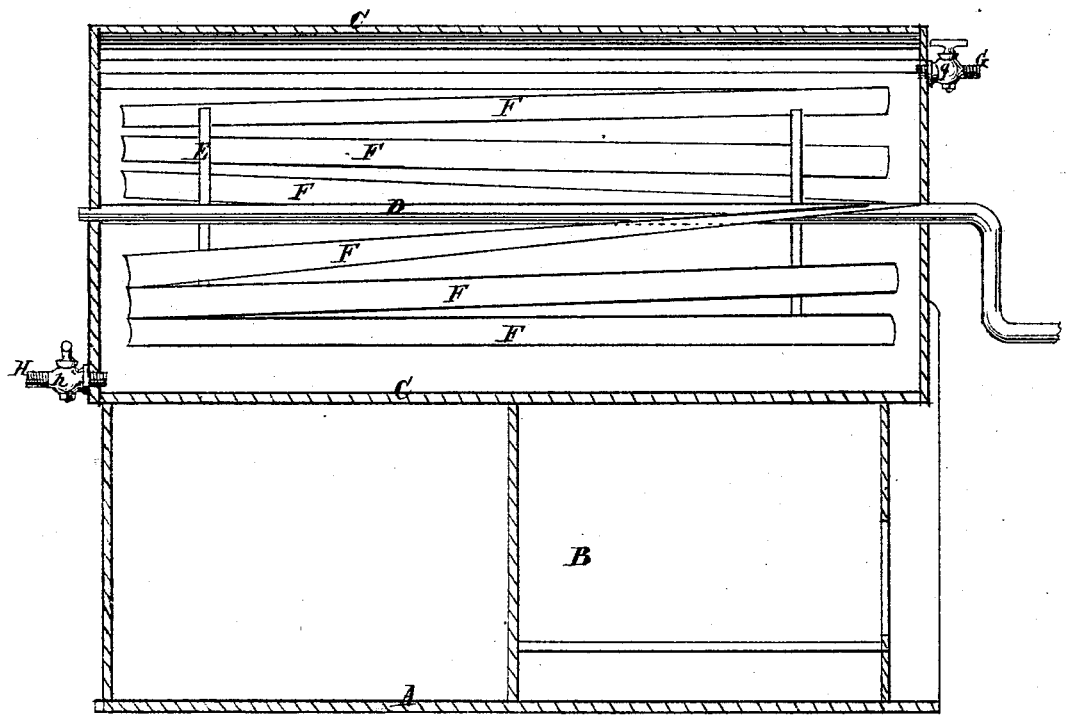
Figure 2:
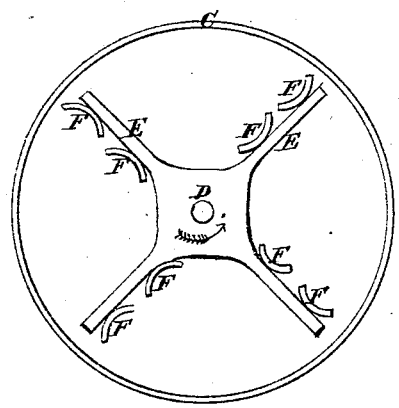

In the accompanying drawing, Figure 1 is a vertical longitudinal section of an apparatus illustrating my invention, and Fig. 2 is a transverse section of the upper portion, showing the mixing-chambers and agitators.

A may represent the base of the apparatus, B the furnace, and C a cylindrical mixing-chamber, through the center of which passes a shaft, D, carrying any desirable number of radial arms, E. To these arms are attached agitating-blades F, of peculiar construction. The arms E and blades F are so arranged that the latter will have the spiral or oblique positions shown in Fig. 1, adapting them, when the shaft is rotated, to gradually forward the contents of the cylinder from the feeding to the discharging end at the same time that a very thorough agitation and commingling of the ingredients are effected. A further peculiarity consists in making the blades or buckets F concave in front, as shown in Fig. 2. This adapts them to scoop and carry up a portion of the material at each revolution, as well as to more effectually mix and agitate the same.

In operation the fatty matter and the alkaline solution may be introduced at one end through one or more pipes, G, by the agency of a pump or pumps, or in any other usual manner, and the soap may be discharged at the other end, as shown at H. These pipes may be provided with cocks $g$ $h$.

By this apparatus the operation of soap-making may be carried on continuously, the supply and discharge being so regulated as to keep the boiler two-thirds or three-fourths full. A safety-valve should be applied to the top of the boiler.

The shaft being turned in the direction indicated by the arrow in Fig. 2, the concave buckets lift or scoop up a portion of the grease and alkali at each revolution and pour it out into the steam space in the upper part of the boiler, where it is more rapidly and thoroughly cooked and saponified than when merely agitated in the lower part.

Claim.

I claim as new, and desire to secure hereby—

The agitator, composed of spirally-arranged concave blades F on a horizontal shaft, D, in combination with the close mixing-chamber C, for stirring, lifting, and forwarding the materials and mixture within the said chamber while acted on further by heat and pressure, all substantially as herein described, for the purpose specified.

EDWIN H. GIBBS.

Witnesses:
B. H. CHADBOURN,
WM. R. TAYLOR, Jr.